US009778679B2

(12) United States Patent
Hagihara

(10) Patent No.: US 9,778,679 B2
(45) Date of Patent: Oct. 3, 2017

(54) TIME SYNCHRONIZATION SYSTEM

(71) Applicant: TLV CO., LTD., Kakogawa shi Hyogo (JP)

(72) Inventor: Kazunari Hagihara, Kakogawa shi Hyogo (JP)

(73) Assignee: TLV Co., Ltd., Hyogo (JP)

( * ) Notice: Subject to any disclaimer, the term of this patent is extended or adjusted under 35 U.S.C. 154(b) by 0 days.

(21) Appl. No.: 14/903,771

(22) PCT Filed: Jul. 1, 2014

(86) PCT No.: PCT/JP2014/067584
§ 371 (c)(1),
(2) Date: Jan. 8, 2016

(87) PCT Pub. No.: WO2015/005183
PCT Pub. Date: Jan. 15, 2015

(65) Prior Publication Data
US 2016/0154420 A1 Jun. 2, 2016

(30) Foreign Application Priority Data

Jul. 10, 2013 (JP) ................................. 2013-144913

(51) Int. Cl.
G06F 13/42 (2006.01)
G06F 1/14 (2006.01)
(Continued)

(52) U.S. Cl.
CPC ............... G06F 1/14 (2013.01); G04G 5/00 (2013.01); G04G 7/00 (2013.01); G06F 1/12 (2013.01)

(58) Field of Classification Search
CPC ........................................................ G06F 1/14
(Continued)

(56) References Cited

U.S. PATENT DOCUMENTS 4,807,259 A * 2/1989 Yamanaka ............. H04B 3/546
340/3.2
2003/0193351 A1* 10/2003 Fukui ............... H03K 19/01721
326/83

(Continued)

FOREIGN PATENT DOCUMENTS

JP 4184297 A 7/1992
JP 8-95664 4/1996

(Continued)

OTHER PUBLICATIONS

International Search Report, dated Oct. 7, 2014, issued in corresponding International Application No. PCT/JP2014/067584.

Primary Examiner — Jaweed A Abbaszadeh
Assistant Examiner — Volvick Derose
(74) Attorney, Agent, or Firm — The Webb Law Firm

(57) ABSTRACT

A control device 2 includes a preset time determinator 22 for determining a preset time to be set to a first real-time clock of a terminal device 3 based on a second real-time clock. The terminal device 3 includes a latency time timer 34 for clocking a lapse of a latency time which is a period of time from the terminal device 3 acquiring the preset time until the preset time being set to the first real-time clock and is calculated in a clocking accuracy having the number of effective figures greater than that of the first real-time clock, and a time setter 32 for setting the preset time to the first real-time clock when the latency time is lapsed.

6 Claims, 7 Drawing Sheets

EXAMPLE OF FUNCTIONAL BLOCK DIAGRAM OF TIME SYNCHRONIZATION SYSTEM

(51) Int. Cl.
  *G04G 7/00* (2006.01)
  *G04G 5/00* (2013.01)
  *G06F 1/12* (2006.01)

(58) Field of Classification Search
  USPC .......................................................... 714/400
  See application file for complete search history.

(56) References Cited

U.S. PATENT DOCUMENTS

| | | | | |
|---|---|---|---|---|
| 2004/0167745 A1* | 8/2004 | Suzuki | ................... | H04Q 9/00 |
| | | | | 702/178 |
| 2007/0081514 A1* | 4/2007 | Shirokura | .............. | H04B 7/269 |
| | | | | 370/350 |
| 2008/0107218 A1 | 5/2008 | Geissler et al. | | |
| 2008/0307075 A1* | 12/2008 | Urano | ..................... | G06F 1/14 |
| | | | | 709/220 |
| 2009/0028006 A1 | 1/2009 | Ha et al. | | |
| 2009/0141699 A1* | 6/2009 | Goshen | ................. | H04J 3/0664 |
| | | | | 370/350 |
| 2009/0257354 A1* | 10/2009 | Hannel | ................. | H04J 3/0697 |
| | | | | 370/241 |
| 2010/0202436 A1* | 8/2010 | Albert | ................... | H04J 3/0655 |
| | | | | 370/350 |
| 2010/0318663 A1* | 12/2010 | Esteve Balducci | . | H04L 67/1095 |
| | | | | 709/227 |
| 2012/0023262 A1* | 1/2012 | Berke | ....................... | G06F 1/12 |
| | | | | 709/248 |
| 2013/0055273 A1* | 2/2013 | Hong | ................... | H04L 67/325 |
| | | | | 718/102 |
| 2013/0227150 A1* | 8/2013 | Ahn | ..................... | H02J 13/0079 |
| | | | | 709/227 |
| 2013/0238553 A1* | 9/2013 | Kim | ................... | G06F 17/30575 |
| | | | | 707/610 |
| 2014/0025723 A1* | 1/2014 | Xu | ...................... | H04L 67/1091 |
| | | | | 709/203 |
| 2014/0156730 A1* | 6/2014 | Liu | .......................... | G04G 7/00 |
| | | | | 709/203 |
| 2015/0058287 A1* | 2/2015 | Zhang | ............... | G06F 17/30575 |
| | | | | 707/610 |

FOREIGN PATENT DOCUMENTS

| | | |
|---|---|---|
| JP | 2004132925 A | 4/2004 |
| JP | 2004-340672 | 12/2004 |
| JP | 2007-163201 | 6/2007 |

* cited by examiner

EXAMPLE OF HOP COUNT MANAGEMENT DATA 443

| TERMINAL DEVICE | NUMBER OF HOPS |
|---|---|
| 3 a | 5 |
| 3 b | 4 |
| 3 c | 3 |
| 3 d | 3 |
| 3 e | 3 |
| : | : |

601 → (3a row)
602 → (3b row)
603 → (3c row)
604 → (3d row)
605 → (3e row)

FIG. 6

TIME SYNCHRONIZATION SYSTEM

TECHNICAL FIELD

The present invention relates to a time synchronization system for synchronizing times between terminals.

BACKGROUND ART

Conventionally, in information process systems which synchronize time, there are some arts which add an acquired time information to a time required for transferring the time information to obtain a time information with fewer errors (e.g., see Patent Document 1).

Further, in conventional seismological observation systems, there are some arts which transmit a future time with respect to the current time from a master seismometer to a slave seismometer in advance, and calibrate the current time of the slave seismometer by the transmitted future time in response to a subsequent clock signal (e.g., see Patent Document 2).

REFERENCE DOCUMENTS OF CONVENTIONAL ART

Patent Documents

Patent Document 1: JPH04-184297A
Patent Document 2: JP2004-132925A

DISCLOSURE OF THE INVENTION

Problems to be Solved by the Invention

However, in the conventional information process systems described above, a case where a difference may exist in the synchronization between a Real Time Clock (RTC) which is a source of synchronization and a CPU or IOP which is a target of synchronization by a number of effective figures per clocking is not taken into consideration. Thus, for example, if the number of effective figures per clocking of RTC which is the source of synchronization is greater than the number of effective figures per clocking of CPU or IPO which is the target of synchronization, it is impossible to perform an accurate time synchronization because, for example, the time in low digits (milliseconds) is not always in agreement with each other.

Further, since communication processing for receiving a clock signal used for the time synchronization always occurs in the conventional seismological observation systems described above, this system cannot achieve power savings when performing battery-drive wireless communications.

Therefore, the subject to be solved by the present invention is to provide a time synchronization system which can accurately perform a time synchronization even when a difference in the number of effective figures per clocking exists between a source of synchronization and a target of synchronization, and can save power by eliminating wireless communications for receiving clock signals.

SUMMARY OF THE INVENTION

In order to solve the problem, a time synchronization system according to the present invention includes one or more terminal devices, each having a first real-time clock, and a control device having a second real-time clock of which the number of effective figures per clocking is greater then that of the first real-time clock. The control device includes a preset time determinator for determining a preset time to be set to the first real-time clock of the terminal device based on the second real-time clock. The terminal device includes: a latency time timer for clocking a lapse of a latency time, the latency time being a period of time from the terminal device acquiring the preset time until the preset time being set to the first real-time clock, and the latency time being calculated in a clocking accuracy having the number of effective figures greater than that of the first real-time clock; and a time setter for setting the preset time to the first real-time clock when the latency time is lapsed.

Effects of the Invention

According to the present disclosure, a time synchronization can accurately be performed even when a difference in the number of effective figures per clocking exists between a source of synchronization and a target of synchronization, and power can be saved by eliminating wireless communications for receiving clock signals.

BRIEF DESCRIPTION OF THE DRAWINGS

FIG. 6 is a view illustrating one example of hop count management data 443.

MODE FOR CARRYING OUT THE INVENTION

Hereinafter, a desirable embodiment of terminal devices and a terminal controlling device which constitute a time synchronization system of the present invention is described with reference to the accompanying drawings. Note that in the following description, a case where the present invention is applied to terminal devices which measure an operating state of a steam trap (not illustrated) and a terminal controlling device (control device) which controls the terminal devices is illustrated and described. Further, dimensions of constituent members in each drawing are not intended to precisely represent dimensions of actual constituent members, scales of the respective constituent members, etc.

1. First Embodiment

1-1. Entire Configuration of Time Synchronization System

Figure 1:
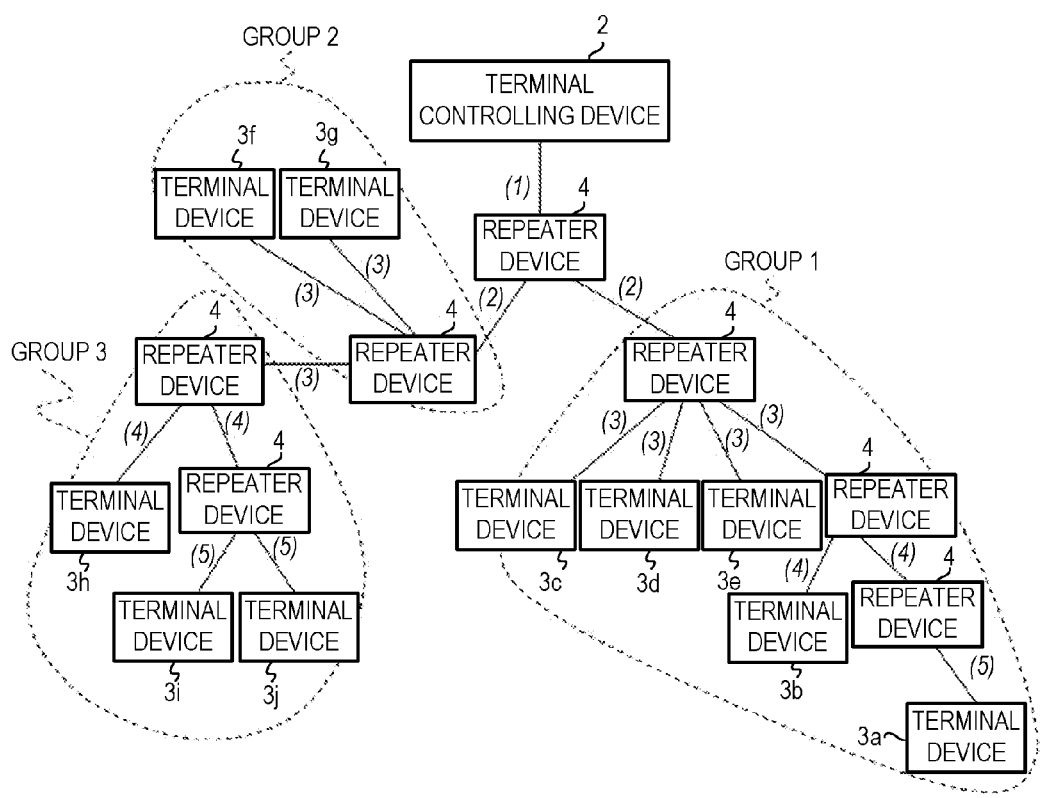
FIG. 1 is a view illustrating one example of an entire configuration of a time synchronization system 1.

FIG. 1 is a view illustrating one example of an entire configuration of a time synchronization system 1 according to a first embodiment of the present invention. The time synchronization system 1 includes, for example, a terminal controlling device 2, a plurality of terminal devices 3, and a plurality of repeater devices 4. For example, the terminal controlling device 2, the terminal devices 3, and the repeater devices 4 all have a wireless communication function, and can wirelessly communicate with each other. Note that in FIG. 1, for convenience of description, although the terminal controlling device 2, the terminal devices 3, and the repeater devices 4 are connected by solid lines, no connection line is necessary if they have the wireless communication function.

For example, the terminal device 3 starts up at a predetermined startup time, measures an operating state of a steam trap installed in a steam piping installation, and sends out the measurement data to the terminal controlling device 2. Note that the startup of the terminal device 3 may be referred to as a "wake-up."

Further, one or more terminal devices 3 form a group of terminal devices 3. For example, as illustrated in FIG. 1, Group 1 is comprised of four terminal devices 3, Group 2 is comprised of two terminal devices 3, and Group 3 is comprised of three terminal devices 3.

The terminal controlling device 2 creates synchronous data for a time synchronization of each terminal device 3 and transmits the data to the respective terminal devices 3, for example. Further, the terminal controlling device 2 receives the measurement data from the terminal devices 3, for example.

The repeater device 4 operates as a repeater device which relays communication data between the terminal controlling device 2 and the terminal device 3, for example.

When each terminal device 3 sends out the measurement data for every predetermined measuring period, it needs to perform a communication processing as efficiently as possible in order to reduce a power consumption. Thus, the terminal controlling device 2 and each terminal device 3 need to synchronize with each other in the current time which is a basis for determining the startup time. Therefore, in this embodiment, one example in which the time of each terminal device 3 is synchronized by transmitting the synchronous data for synchronizing the current time to each terminal device 3 from the terminal controlling device 2 is described.

1-2. Functional Block Diagram of Time Synchronization System

Figure 2:
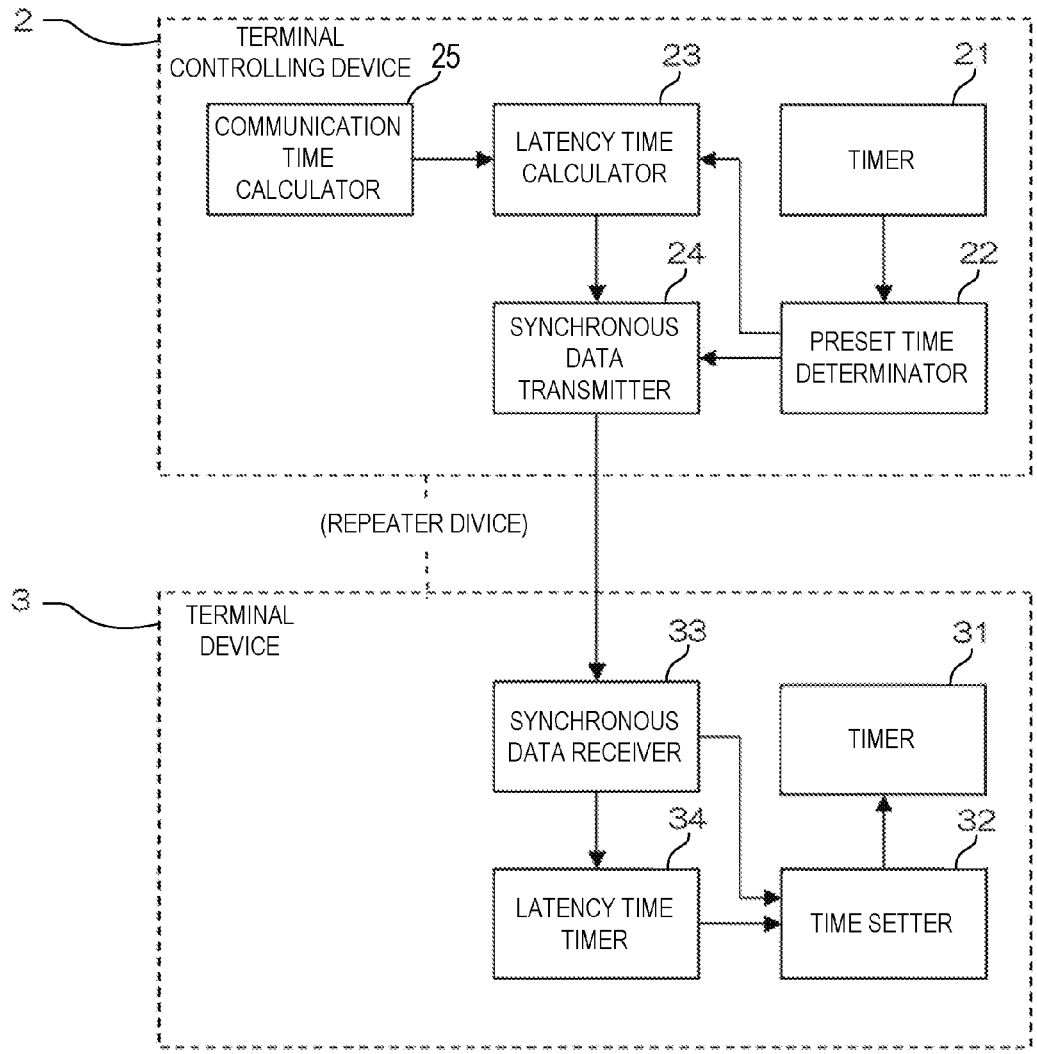
FIG. 2 is a view illustrating one example of a functional block diagram of the time synchronization system 1.

FIG. 2 is a view illustrating one example of a functional block diagram of the time synchronization system 1.

1-2-1. Functional Block Diagram of Terminal Controlling Device 2

The terminal controlling device 2 includes a timer 21 which clocks time, a preset time determinator 22 which determines a time to be set to the terminal device 3, a latency time calculator 23 which calculates a latency time when the terminal device 3 sets the preset time, a synchronous data transmitter 24 which transmits preset time data and latency time data to the terminal device 3 as the synchronous data, and a communication time calculator 25 which calculates a communication period of time between the terminal controlling device 2 and the terminal device 3.

The timer 21 can continue clocking the current time, for example, even if the power of the terminal controlling device 2 is turned off. The timer 21 can clock time for example, in "milliseconds."

The preset time determinator 22 can determine, for example, a future time of the current time as the time to be set to the terminal device 3. For example, the preset time determinator 22 determines the preset time in "milliseconds" as "000 milliseconds."

The latency time calculator 23 can determine the latency time which is a period of time from the terminal device 3 acquiring the preset time until setting the preset time, for example, based on a lapsed time of the time synchronization processing in the terminal controlling device 2 and the communication time between the terminal controlling device 2 and the terminal device 3.

The synchronous data transmitter 24 can transmit as the synchronous data, for example, the preset time data which is indicative of the preset time and is determined by the preset time determinator 22, and the latency time data which is indicative of the latency time and is calculated by the latency time calculator 23.

The communication time calculator 25 can calculate the communication times, for example, when the terminal controlling device 2, the terminal devices 3, and the repeater devices 4 communicate, based on the number of hops etc. between the respective devices.

1-2-2. Functional Block Diagram of Terminal Device 3

The terminal device 3 includes a timer 31 which clocks time, a time setter 32 which sets a time to the timer 31 using the preset time, a synchronous data receiver 33 which receives the preset time data and the latency time data as the synchronous data from the terminal controlling device 2, and a latency time timer 34 which clocks the latency time based on the latency time data from the terminal controlling device 2.

The timer 31 can continue clocking the current time, for example, even if the power of the terminal device 3 is turned off. The timer 31 can clock time, for example, in "seconds." That is, the timer 31 of the terminal device 3 cannot clock time in "milliseconds," unlike the timer 21 of the terminal controlling device 2. Therefore, the number of effective figures per clocking of the timer 21 is greater than the number of effective figures per clocking of the timer 31.

The time setter 32 can set the current time to the timer 31, for example, by using the preset time data indicative of the preset time which is contained in the synchronous data received from the terminal controlling device 2.

The synchronous data receiver 33 can receive as the synchronous data, for example, the preset time data indicative of the preset time which is determined by the preset time determinator 22 of the terminal controlling device 2 and the latency time data indicative of the latency time which is calculated by the latency time calculator 23 of the terminal controlling device 2.

The latency time timer 34 can clock the latency time, for example, based on the latency time data contained in the synchronous data which is received by the synchronous data receiver 33.

Note that the terminal device 3 is provided with a measuring part (not illustrated), and can measure, for example, a surface temperature and/or ultrasonic vibration of a steam trap 5. Further, measurement data of the steam trap which is measured by the measuring part is wirelessly transmitted to the terminal controlling device 2.

1-3. Example of Hardware Configuration of Time Synchronization System

1-3-1. Example of Hardware Configuration of Terminal Controlling Device 2

Figure 3:
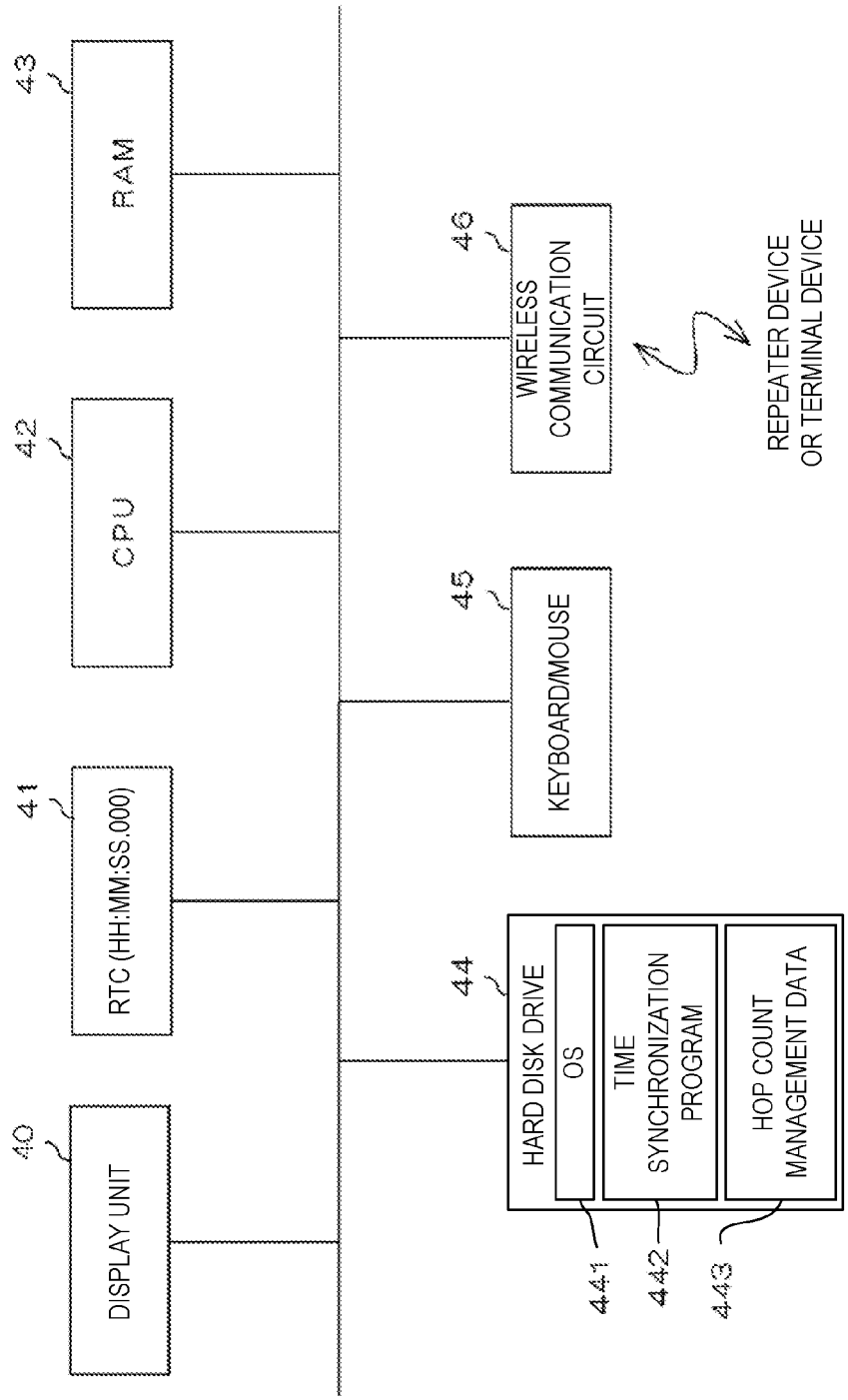
FIG. 3 is a view illustrating one example of a hardware configuration in which a terminal controlling device 2 is implemented by using a CPU etc.

FIG. 3 is a view illustrating one example of a hardware configuration in which the terminal controlling device 2 is implemented using a CPU etc. The terminal controlling device 2 can be comprised of, for example, a laptop personal computer.

The terminal controlling device 2 includes a display unit 40, a Real Time Clock (RTC) 41, a CPU 42, a Random Access Memory (RAM) 43, a hard disk drive 44, a keyboard/mouse 45, and a wireless communication circuit 46.

The display unit 40 can display an entry or entries from the keyboard/mouse 45, measurement data, etc. The RTC 41 can present the current time by a clock function as data, for example, indicated in milliseconds (hh:mm:ss.000). The CPU 42 can execute a time synchronization program 442 stored in the hard disk drive 44. The RAM 43 can provide the CPU 42 with an address space.

The hard disk drive 44 can store an operating system (OS) 441, the time synchronization program 442, hop count management data 443, measurement data (not illustrated), etc. The keyboard/mouse 45 can accept input operation(s) for a control of the terminal device 3 from a user. The wireless communication circuit 46 can wirelessly communicate with the terminal devices 3 or the repeater devices 4.

The timer 21, which constitutes the terminal controlling device 2 illustrated in FIG. 2, is implemented by the RTC 41. Further, the preset time determinator 22, the latency time calculator 23, the synchronous data transmitter 24, and the communication time calculator 25 are implemented by running the time synchronization program 442 on the CPU 42.

1-3-2. Example of Hardware Configuration of Terminal Device 3

Figure 4:
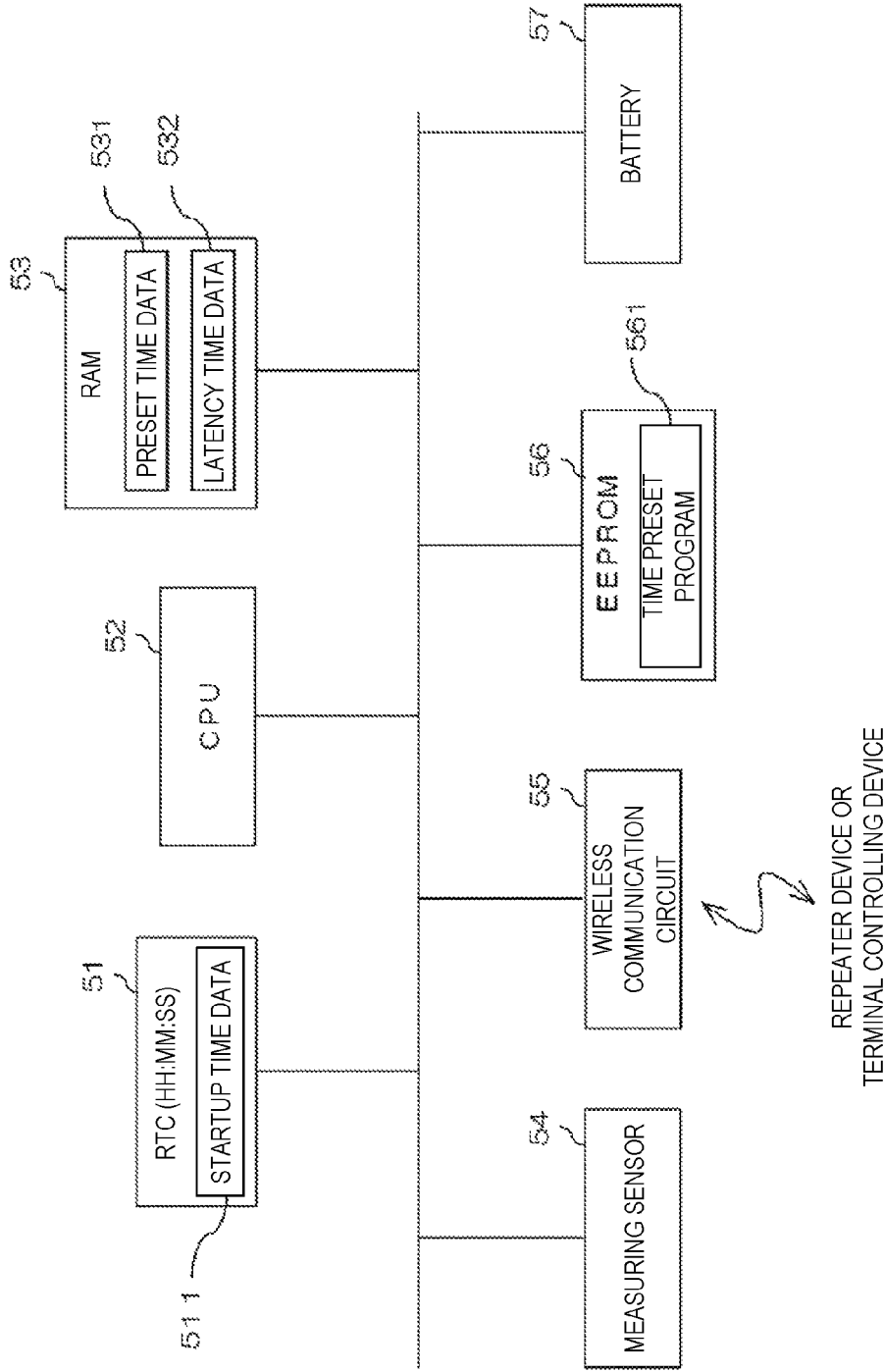
FIG. 4 is a view illustrating one example of a hardware configuration in which a terminal device 3 is implemented by using a CPU etc.

FIG. 4 is a view illustrating one example of a hardware configuration in which the terminal device 3 is implemented by using the CPU etc. The terminal device 3 includes a Real Time Clock (RTC) 51, a CPU 52, a RAM 53, a measuring sensor 54, a wireless communication circuit 55, and an Electrically Erasable and Programmable Read Only Memory (EEPROM) 56, and a battery 57.

The RTC 51 can provide the current time as data, for example, in seconds (hh:mm:ss) by a clock function, and can start up the terminal device 3 concerned at a time corresponding to the startup time data 511 which is set, by a timer function. The CPU 52 can execute a time preset program 561 stored in the EEPROM 56. The RAM 53 can provide the CPU 52 with an address space, and can store preset time data 531, latency time data 532, etc.

The measuring sensor 54 can measure an operating state of a steam trap, for example, by a vibration sensor which uses a piezoelectric element and a temperature sensor which uses a thermocouple. The wireless communication circuit 55 can communicate with the terminal controlling device 2 or the repeater devices 4. The EEPROM 56 can store the time preset program 561. The battery 57 can supply power to each part of the terminal device 3. The battery 57 corresponds to, for example, a dry battery or a secondary battery.

The timer 31, which constitutes the terminal device 3 illustrated in FIG. 2, is implemented by the RTC 51. Further, the time setter 32, the synchronous data receiver 33, and the latency time timer 34 are implemented by running the time preset program 561 on the CPU 52.

1-4. Flowchart of Time Setting Processing

Figure 5:
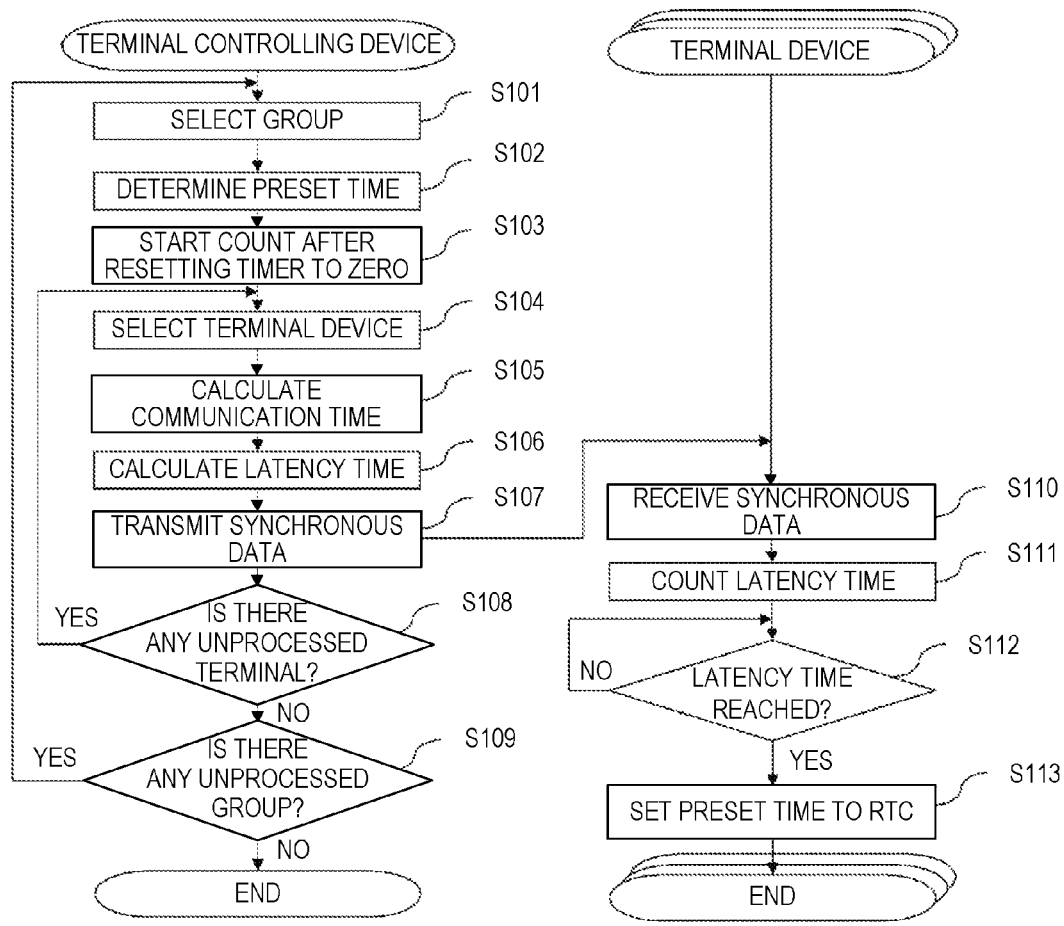
FIG. 5 is a view illustrating one example of a flowchart of an initialization processing in the time synchronization system 1.

FIG. 5 is a view illustrating one example of a flowchart of a time setting processing in the time synchronization system 1.

For example, the CPU 42 of the terminal controlling device 2 can perform the time setting processing of this embodiment when performing processing for setting the startup time data 511 to the RTC 51 of the terminal device 3. Note that in this embodiment, description about the processing for the setting the startup time data 511 is omitted.

In FIG. 5, the CPU 42 of the terminal controlling device 2 selects one of the groups of the terminal device 3 (step S101). For example, the groups are selected in an order which allows efficient operations of the terminal devices and the repeater devices. In this embodiment, the groups are selected in an order of Group 1, Group 2, and Group 3 illustrated in FIG. 1.

The CPU 42 determines the preset time to be set to the RTC 51 of the terminal device 3 (step S102). For example, the CPU 42 can determine a "1 second" future time of the current time as the preset time. Specifically, the CPU 42 determines, for example, "00 hour, 00 minute, 01 second, 000 millisecond" which is a "1 second, 000 millisecond" future time of the current time (initial time) "00 hour, 00 minute, 00 second, 000 millisecond" as the preset time.

The CPU 42 starts a count after resetting the timer used for measuring the processing time to zero (step S103). Here, the term "processing time" as used herein refers to a time required for calculating the communication time after selecting the terminal device as will be described later, for example. In this embodiment, all the processing times for the respective terminal devices are described as "60 milliseconds."

Note that a time required for calculating the latency time described later may be estimated and included into the processing time. Further, a time required for transmitting the synchronous data described later may be estimated and included into the processing time.

The CPU 42 selects the terminal device to which the synchronous data is transmitted (step S104). For example, the CPU 42 selects a terminal device 3a belonging to Group 1 of FIG. 1.

The CPU 42 calculates the communication time of the selected terminal device (step S105). For example, the CPU 42 extracts the number of hops "5" of the terminal device 3a from a record 601 of the hop count management data 443 illustrated in FIG. 6, and calculates as the communication time "100 milliseconds" by multiplying the number of hops "5" by the communication time "20 milliseconds" per hop.

Note that, in a case of the terminal device 3b, the CPU 42 extracts the number of hops "4" of the terminal device 3b from a record 602 of the hop count management data 443 illustrated in FIG. 6, and calculates as the communication time "80 milliseconds" by multiplying the number of hops "4" by the communication time "20 milliseconds" per hop. Further, in a case of terminal devices 3c-3e, the CPU 42 extracts the number of hops "3" of the terminal devices 3c-3e from the respective records 603-605 of the hop count management data 443 illustrated in FIG. 6, and calculates as the communication time "60 milliseconds" by multiplying the number of hops "3" by the communication time "20 milliseconds" per hop, respectively.

Next, the CPU 42 calculates the latency time of the selected terminal device (step S106). For example, the CPU 42 can calculate the latency time by adding the processing time which the timer reset to zero at step S103 described above is currently counting to the communication time and the processing time which are calculated at step S105 described above. Note that if the time required for calculating the latency time and the time required for transmitting the synchronous data described later are included in the processing time, such times are contained in the calculated latency time.

Figure 7:
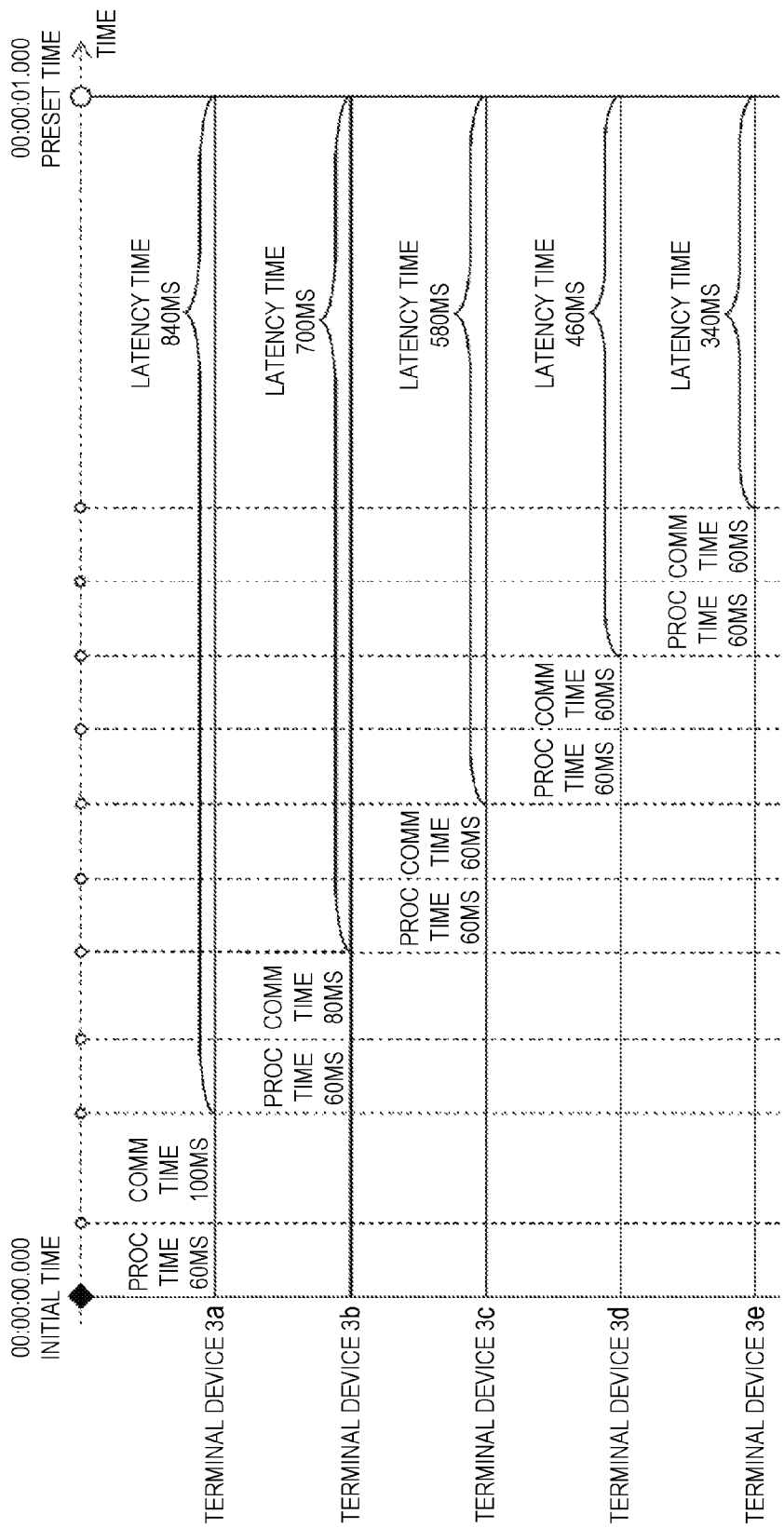
FIG. 7 is a view schematically illustrating one example in a case of calculating latency times of the terminal devices 3.

FIG. 7 is a view schematically illustrating one example in a case of calculating the latency times of the terminal devices 3. When the processing time of the terminal device 3a is "60 milliseconds," the latency time is calculated as "840 milliseconds" by subtracting the processing time "60 milliseconds" and the communication time "100 milliseconds" from 1 second (1000 milliseconds). In this case, for example, the processing time "60 milliseconds" and the communication time "100 milliseconds" correspond to a "time required for acquiring the preset time by the terminal device."

The CPU 42 generates the synchronous data by combining the data indicative of the preset time with the data indicative of the latency time, and transmits the generated synchronous data to the terminal device 3. For example, the synchronous data is generated by combining data "00 hour, 00 minute, 01 second" indicative of the preset time with data "840 milliseconds" indicative of the latency time, and the generated data is then transmitted. Note that the digits in milliseconds (000 milliseconds) are omitted from the data indicative of the preset time because the effective digits of the RTC 51 of the terminal device 3 are only up to seconds.

When the synchronous data is received from the terminal controlling device 2 (step S110), the CPU 52 of the terminal device 3 reads the data indicative of the latency time among the received synchronous data, and then counts the latency time (step S111). For example, the CPU 52 of the terminal device 3a counts the latency time until the count reaches "840 milliseconds."

If it is determined that the count reaches the latency time (YES processing at step S112), the CPU 52 sets the data indicative of the preset time among the received synchronous data to the preset time data 511 of the RTC 51 (step S113). Specifically, the CPU 52 sets "00 hour, 00 minute, 01 second" to the RTC 51.

On the other hand, the CPU 42 of the terminal controlling device 2 determines whether there is an unprocessed terminal device 3 (step S108), and if there is an unprocessed terminal device 3, the CPU 42 returns to step S104 described above, and repeats the processing (YES determination at step S108).

As illustrated in FIG. 7, the CPU 52 of the terminal device 3b sets "00 hour, 00 minute, 01 second" which is the data indicative of the preset time to the RTC 51 after the latency time is counted until the count reaches "700 milliseconds."

Further, for example, the CPU 52 of the terminal device 3c sets "00 hour, 00 minute, 01 second" which is the data indicative of the preset time to the RTC 51 after the latency time is counted until the count reaches "580 milliseconds." Further, for example, the CPU 52 of the terminal device 3d sets "00 hour, 00 minute, 01 second" which is the data indicative of the preset time to the RTC 51 after the latency time is counted until the count reaches "460 milliseconds." Further, for example, the CPU 52 of the terminal device 3e sets "00 hour, 00 minute, 01 second" which is the data indicative of the preset time to the RTC 51 after the latency time is counted until the count reaches "340 milliseconds."

Next, if there is no unprocessed terminal device 3 (NO determination at step S108), the CPU 42 of the terminal controlling device 2 then determines whether there is an unprocessed group (step S109), and if there is an unprocessed group, the CPU 42 returns to step S101 described above, and repeats the processing (YES determination at step S109).

For example, when the time synchronization processing is completed for the terminal devices 3a-3e belonging to Group 1 illustrated in FIG. 1, the CPU 42 performs the time synchronization processing for the terminal devices 3f and 3g belonging to Group 2. Further, when the time synchronization processing is completed for the terminal devices 3f and 3g belonging to Group 2, the time synchronization processing is performed for the terminal devices 3h-3j belonging to Group 3.

Thus, the terminal controlling device 2 transmits the preset time data indicative of the future time and the latency time data which are different for different terminal devices, and each terminal device 3 then sets the preset time indicative of the received preset time data to the RTC at the timing of reaching the latency time indicative of the received latency time data. Therefore, even if there is a difference in the number of effective figures per clocking of the RTC between the terminal controlling device 2 which is the source of synchronization and each terminal device 3 which is the target of synchronization, the time of each terminal device 3 can certainly be synchronized. Further, since the synchronous timings are in agreement with each other based on the latency times, wireless communications for receiving clock signals can be eliminated, thereby saving power.

2. Other Embodiments

In the embodiment described above, although all the processing times of the respective terminal devices are "60 milliseconds," a time required for calculating the latency times may be included in the processing time. Further, a time required for transmitting the synchronous data may also be estimated and included in the processing time.

In the embodiment described above, although an example in which the "1 second" future time of the current time is determined as the preset time is described, other future times may be determined as the preset time. For example, the preset time may be determined according to the number of terminal devices 3 within a group. Specifically, a time interval between the current time and the preset time can be lengthened as more terminal devices 3 are provided.

In the embodiment described above, although an example in which the communication time when the terminal device 3 communicates with the repeater device 4 is calculated based on the number of hops between the respective devices etc. is described, the communication time may be a predetermined time. For example, all the communication times within a group may be "50 milliseconds." Thus, it becomes possible to omit a processing for calculating the communication times, thereby accelerating the processing.

Note that, if all the processing times and communication times within a group are a fixed time, respectively, a difference in timings of acquiring the preset time between two terminal devices becomes in agreement with a difference in the latency times between the two terminal devices. Specifically, if a total time of the processing time and the communication time is "100 milliseconds," a difference in the timings of acquiring the preset time between the terminal devices 3a and 3b is "100 milliseconds," and a difference in the latency times between the terminal devices 3a and 3b is "100 milliseconds."

Two or more of some or all of the configurations which are described in the embodiments described above may also be combined.

DESCRIPTION OF REFERENCE NUMERALS

21 Timer
22 Preset Time Determinator

23 Latency Time Calculator
24 Synchronous Data Transmitter
25 Communication Time Calculator
31 Timer
32 Time Setter
33 Synchronous Data Receiver
34 Latency Time Timer

What is claimed is:

1. A time synchronization system, comprising:
one or more terminal devices, each having a first real-time clock; and
a control device having a second real-time clock of which the number of effective digits per clocking is greater than that of the first real-time clock,
wherein the control device includes a preset time determinator for determining a preset time to be set to the first real-time clock of the terminal device based on the second real-time clock, and
wherein the terminal device includes:
a latency time timer for clocking a lapse of a latency time, the latency time being a period of time from the terminal device acquiring information containing the preset time until the preset time being set to the first real-time clock based on the information, the latency time being calculated in a clocking accuracy having the number of effective digits greater than that of the first real-time clock, and the latency time being a period of time in which, when lapsed, a fraction of clocking of the second real-time clock relative to a lowest digit position of clocking of the first real-time clock becomes zero; and
a time setter for setting the preset time to the first real-time clock when the latency time is lapsed.

2. The time synchronization system of claim 1, wherein the control device further includes a latency time calculator for calculating the latency time by subtracting from the preset a time required for the terminal device to acquire the preset time.

3. The time synchronization system of claim 2, wherein the control device calculates the latency time when setting the same preset time to at least two or more terminal devices, so that a difference in timings of acquiring the preset time between two of the terminal devices is in agreement with a difference in the latency times between the two terminal devices.

4. The time synchronization system of claim 1, wherein the terminal device is driven by a battery, and acquires the preset time and the latency time by wirelessly communicating with the control device.

5. The time synchronization system of claim 1, wherein the control device calculates a timing at which the terminal device acquires the preset time, based on the number of hops between the control device and the terminal device.

6. A method of setting time using a control device comprising:
one or more terminal devices, each having a first real-time clock; and
a control device having a second real-time clock of which the number of effective digits per clocking is greater than that of the first real-time clock,
wherein the control device includes a preset time determinator for determining a preset time to be set to the first real-time clock of the terminal device based on the second real-time clock, and
wherein the terminal device includes:
a latency time timer for clocking a lapse of a latency time, the latency time being a period of time from the terminal device acquiring information containing the preset time until the preset time being set to the first real-time clock based on the information, and the latency time being calculated in a clocking accuracy having the number of effective digits greater than that of the first real-time clock, and the latency time being a period of time in which, when lapsed, a fraction of clocking of the second real-time clock relative to a lowest digit position of clocking of the first real-time clock becomes zero; and
a time setter for setting the preset time to the first real-time clock when the latency time is lapsed.

* * * * *